(12) United States Patent
Hanagan

(10) Patent No.: US 7,556,114 B2
(45) Date of Patent: Jul. 7, 2009

(54) MOTORCYCLE WITH INTERCHANGEABLE REAR COMPONENTS

(76) Inventor: Michael W. Hanagan, 201 Glen Falls Ct., Hollister, CA (US) 95023

( * ) Notice: Subject to any disclaimer, the term of this patent is extended or adjusted under 35 U.S.C. 154(b) by 14 days.

(21) Appl. No.: 11/384,673

(22) Filed: Mar. 20, 2006

(65) Prior Publication Data

US 2006/0180373 A1 Aug. 17, 2006

Related U.S. Application Data

(63) Continuation-in-part of application No. 11/042,554, filed on Jan. 24, 2005, now Pat. No. 7,290,632.

(51) Int. Cl.
*B62D 61/02* (2006.01)

(52) U.S. Cl. .................. 180/219; 297/195.13; 224/413; 224/430

(58) Field of Classification Search ............ 297/215.12, 297/195.13, 188.1, 188.09; 180/219; 224/423, 224/430, 431, 435, 413; 295/78.1
See application file for complete search history.

(56) References Cited

U.S. PATENT DOCUMENTS

| | | | |
|---|---|---|---|
| 3,822,917 A | 7/1974 | George | |
| 3,913,974 A | 10/1975 | Bowen | |
| 4,171,731 A * | 10/1979 | Hilber | ......................... 180/219 |
| 4,195,757 A * | 4/1980 | Jefferson | ..................... 224/414 |
| 4,257,544 A | 3/1981 | Dierkes | |
| 4,266,703 A | 5/1981 | Litz | |
| 4,576,411 A | 3/1986 | Kitamura | |
| 4,629,201 A | 12/1986 | Tsukiji | |
| 4,932,101 A | 6/1990 | Lualdi | |
| 4,953,259 A | 9/1990 | Frye et al. | |
| 4,953,911 A | 9/1990 | Hanagan | |
| 4,993,731 A * | 2/1991 | Fuller | ......................... 280/202 |
| 5,044,646 A * | 9/1991 | Iiga et al. | ..................... 180/219 |
| 5,127,560 A | 7/1992 | Miyamoto et al. | |
| 5,147,077 A | 9/1992 | Nakajima et al. | |
| 5,533,783 A * | 7/1996 | Harms et al. | ........... 297/195.13 |
| 5,926,917 A | 7/1999 | Gantz | |
| 5,931,360 A * | 8/1999 | Reichert | ..................... 224/413 |
| 5,997,088 A | 12/1999 | Stark et al. | |
| 6,007,150 A * | 12/1999 | Clerkin et al. | ......... 297/215.12 |
| 6,224,081 B1 | 5/2001 | Wayman et al. | |
| 6,237,710 B1 | 5/2001 | Mori et al. | |
| 6,336,579 B1 * | 1/2002 | Sako | .......................... 224/413 |
| 6,354,476 B1 | 3/2002 | Alderman | |
| 6,484,914 B1 * | 11/2002 | Willey | ........................ 224/413 |
| 6,497,300 B2 | 12/2002 | Mori et al. | |

(Continued)

*Primary Examiner*—Paul N Dickson
*Assistant Examiner*—Maurice Williams

(57) ABSTRACT

A convertible motorcycle assembly has a chassis, a driver's seat, and a latch assembly which secures the driver's seat to the forward portion of the chassis. A bracket is mounted on the chassis adjacent the rearward end of the driver's seat, and selectively mounted on the chassis rearwardly of the driver's seat are interchangeable rear components comprising a passenger seat and a storage compartment. The forward end of the interchangeable rear components has at least one forwardly extending tongue engaged with the bracket, and the rear component is secured to the chassis by a second latch assembly adjacent the rear end of the rear component. This latch assembly includes a second releasable latch on the chassis and second key lock on the rear component engaged with the second latch assembly for effecting and preventing release of the second latch assembly.

9 Claims, 22 Drawing Sheets

U.S. PATENT DOCUMENTS

| | | | |
|---|---|---|---|
| 6,568,699 B2 * | 5/2003 | McCann | 280/304.4 |
| 6,581,243 B2 | 6/2003 | Parizel | |
| 6,595,033 B1 | 7/2003 | Hara et al. | |
| 6,623,071 B2 | 9/2003 | Kawamoto et al. | |
| 6,648,408 B1 * | 11/2003 | Grove | 297/195.13 |

* cited by examiner

MOTORCYCLE WITH INTERCHANGEABLE REAR COMPONENTS

CROSS REFERENCE TO RELATED APPLICATION

The present application is a continuation-in-part of application Ser. No. 11/042,554 filed Jan. 24, 2005, now U.S. Pat. No. 7,290,632 and entitled Motorcycle Seat With Integrated Lock.

BACKGROUND OF THE INVENTION

Motorcycle owners generally prefer motorcycles which have only a driver's seat and provide a streamlined appearance. However, they also like tandem saddles to carry passengers. Moreover, they frequently wish to include a backrest for the passengers.

Some motorcycle owners would welcome the opportunity to convert their cycle from a tandem seat to a single seat with a storage unit, and to have rear seat and storage units which have configurations which blend into the basic motorcycle design. Moreover, some motorcycle owners would welcome the opportunity to replace their unitary tandem saddles with a convertible assembly which provides versatility and has a stylish appearance.

In U.S. patent application Ser. No. 11/042,554, there is described a structural assembly which releasably locks saddles and storage units on the motorcycle chassis.

It is an object of the present invention to provide a novel motorcycle assembly in which the owner can readily exchange a passenger seat for a storage compartment, and vice versa.

It is also an object to provide such a motorcycle assembly in which passenger seat and storage units easily blend into the aerodynamic design of the motorcycle body.

Another object is to provide such an assembly in which the seat and storage compartment components can be readily fabricated and securely mounted on the motorcycle chassis.

A further object is to provide such a motorcycle assembly with a removable passenger seat in which a sturdy backrest can be securely mounted.

SUMMARY OF THE INVENTION

It has now been found that the foregoing and related objects may be readily attained in a convertible motorcycle assembly including a chassis, a driver's seat, and a first latch means securing the driver's seat to the forward portion of the chassis. A releasable first latch element on the chassis and a cooperating latch element on the driver's seat is engaged with the first latch element for effecting and preventing release of the first latch means. A bracket is mounted on the chassis adjacent the rearward end of the driver's seat, and there are interchangeable rear components for selective mounting on the chassis rearwardly of the driver's seat, and comprising a passenger seat and a storage compartment.

The forward end of each of the interchangeable rear components has at least one forwardly extending tongue engaged with the bracket. Securing the rear component to the chassis is second latch means comprising a releasable second latch element on the chassis adjacent the rear end of the rear component and a second cooperating latch element on the rear component. A first key lock is engaged with the second latch means for effecting and preventing release of the second latch means. Each of the rear components can be readily released and removed from the chassis and replaced by the other rear component.

Preferably, there is included a second key lock engaged with the first latch means for effecting and preventing release of the first latch means. Alternatively, the first latch means may be accessed upon removal of the rear component to release the latch means and thereby permit removal of the driver's seat.

In one embodiment, the first key lock for the second latch means is mounted on the side of the passenger seat or compartment and readily accessible. Alternatively, the first key lock is mounted on the chassis when it is readily accessible. Generally, a connector connects the key lock to the first latch means to effect disengagement thereof.

Desirably, the passenger seat includes a rigid platform and a receptacle mounted on the platform adjacent the rear end thereof. A seatback support arm is releasably seated in the receptacle and a seatback cushion is mounted on the upper end of the arm. The storage compartment has a body and a door pivotably mounted on the body, and a key lock on the door secures the door in a closed position.

In one embodiment, the latch means for securing the driver's seat on the chassis includes (i) a latch pin mounted on the motorcycle chassis, (ii) a latch housing mounted on the seat and having a passage into which the latch pin extends, (iii) a latch lever pivotably mounted in said housing and pivotable into a latching position in which it engages the latch pin to prevent its retraction from the latch housing, and (iii) biasing means biasing the latch lever into the latching position. The latch lever is pivotable against the biasing action of said biasing means to disengage the latch lever from the latch pin and permit the driver's seat to be disengaged from the latch pin. A key lock is mounted on the exterior of the component and includes a rotatable shaft and a latch lever engaging means on the shaft engageable with the latch level to effect pivoting thereof.

DETAILED DESCRIPTION OF THE PREFERRED EMBODIMENTS

Figure 1:
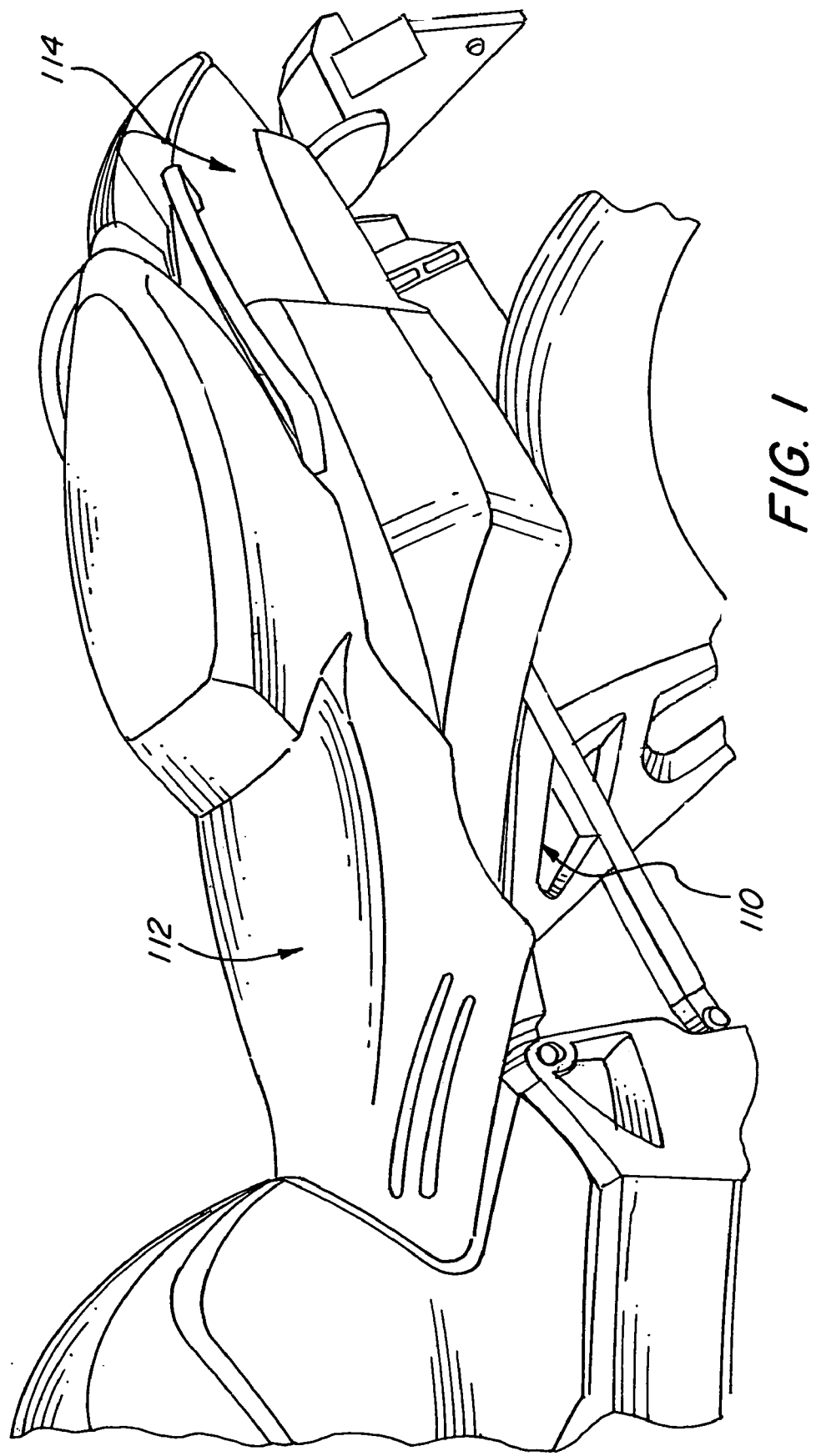
FIG. 1 is a fragmentary perspective view of a conventional motorcycle having a unitary tandem saddle mounted on the chassis.

Turning first to FIG. 1, therein illustrated is a conventional motorcycle assembly having a chassis generally indicated by the numeral 110, a unitary tandem saddle generally indicated by the numeral 112, and attached body components generally indicated by the numeral 114.

Figure 2:
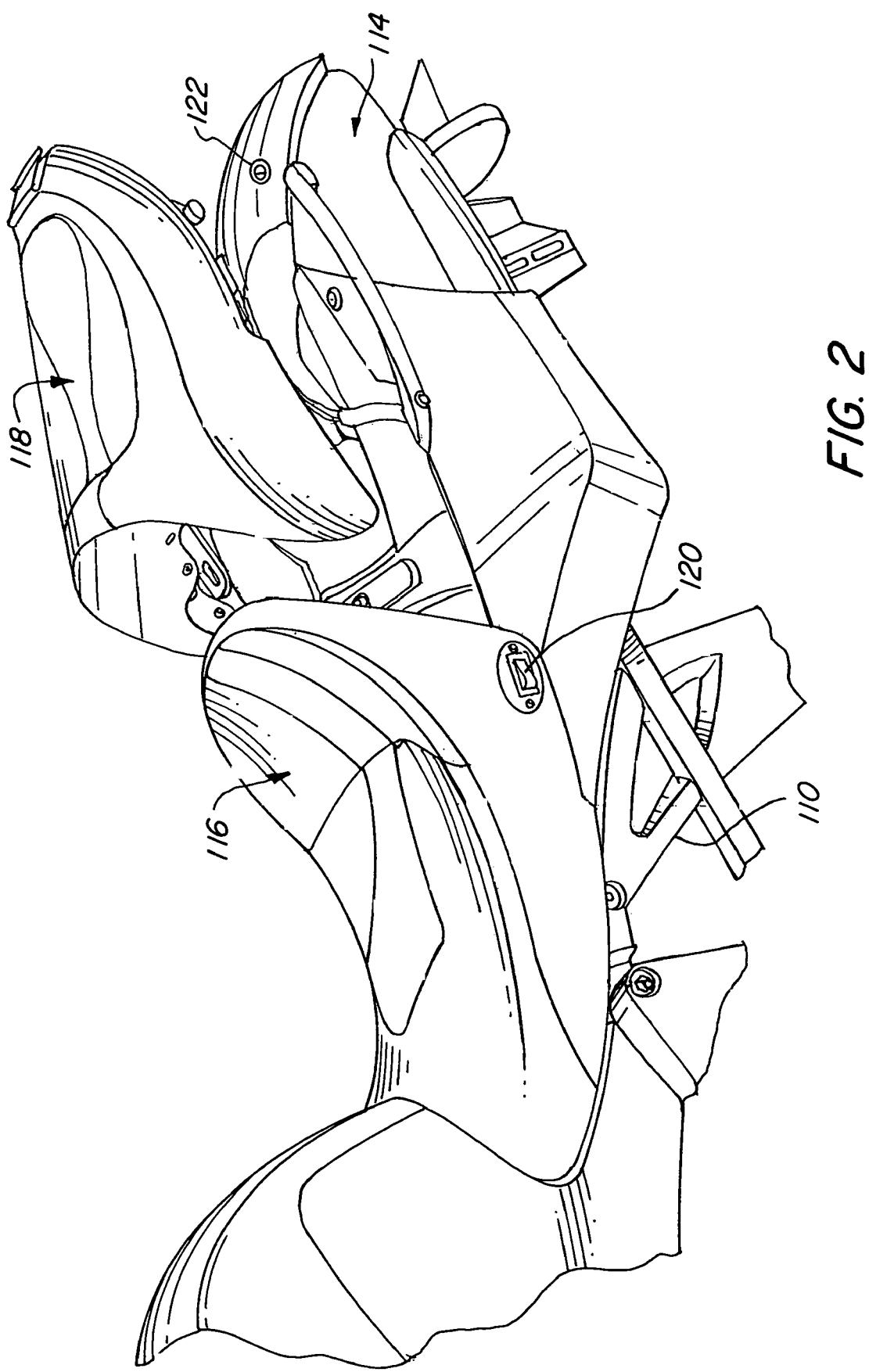
FIG. 2 is a fragmentary perspective view of a motorcycle assembly embodying the present invention with a passenger seat module elevated above from the motorcycle chassis.

In FIG. 2, the tandem saddle 112 has been replaced by a driver's seat generally designated by the numeral 116 and a separate passenger seat generally designated by the numeral 118 which is shown in an elevated position. Also seen are a key lock 120 for the driver's seat 116, and a key lock 122 for the passenger seat 118.

Figure 3:
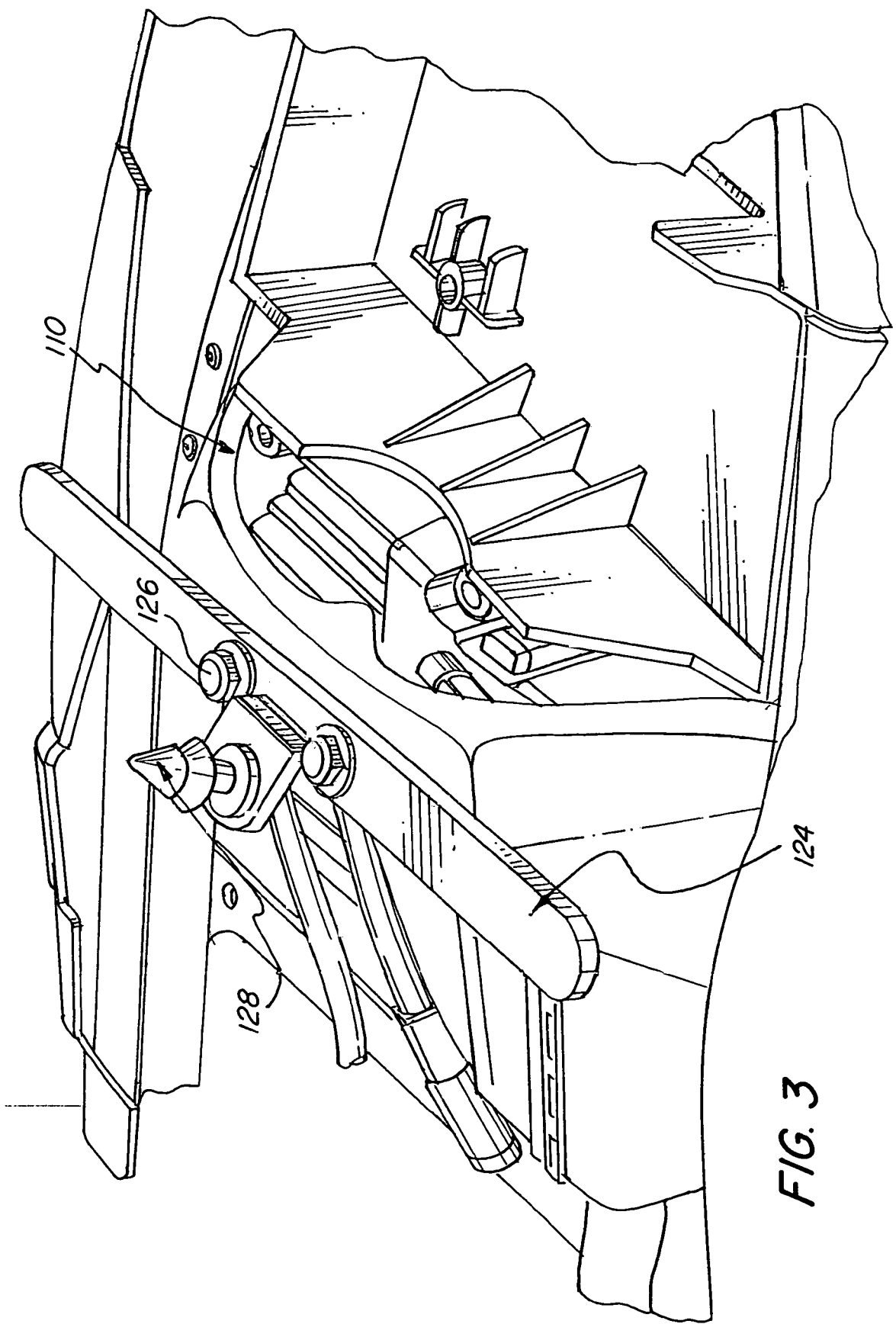
FIG. 3 is an enlarged fragmentary perspective view of a motorcycle assembly with a bracket and latch assembly for the driver's seat installed on the motorcycle chassis.

In FIG. 3, a bracket 124 has been mounted on the chassis 112 by the fasteners 126 and a latch pin 128 extends upwardly therefrom.

Figure 4:
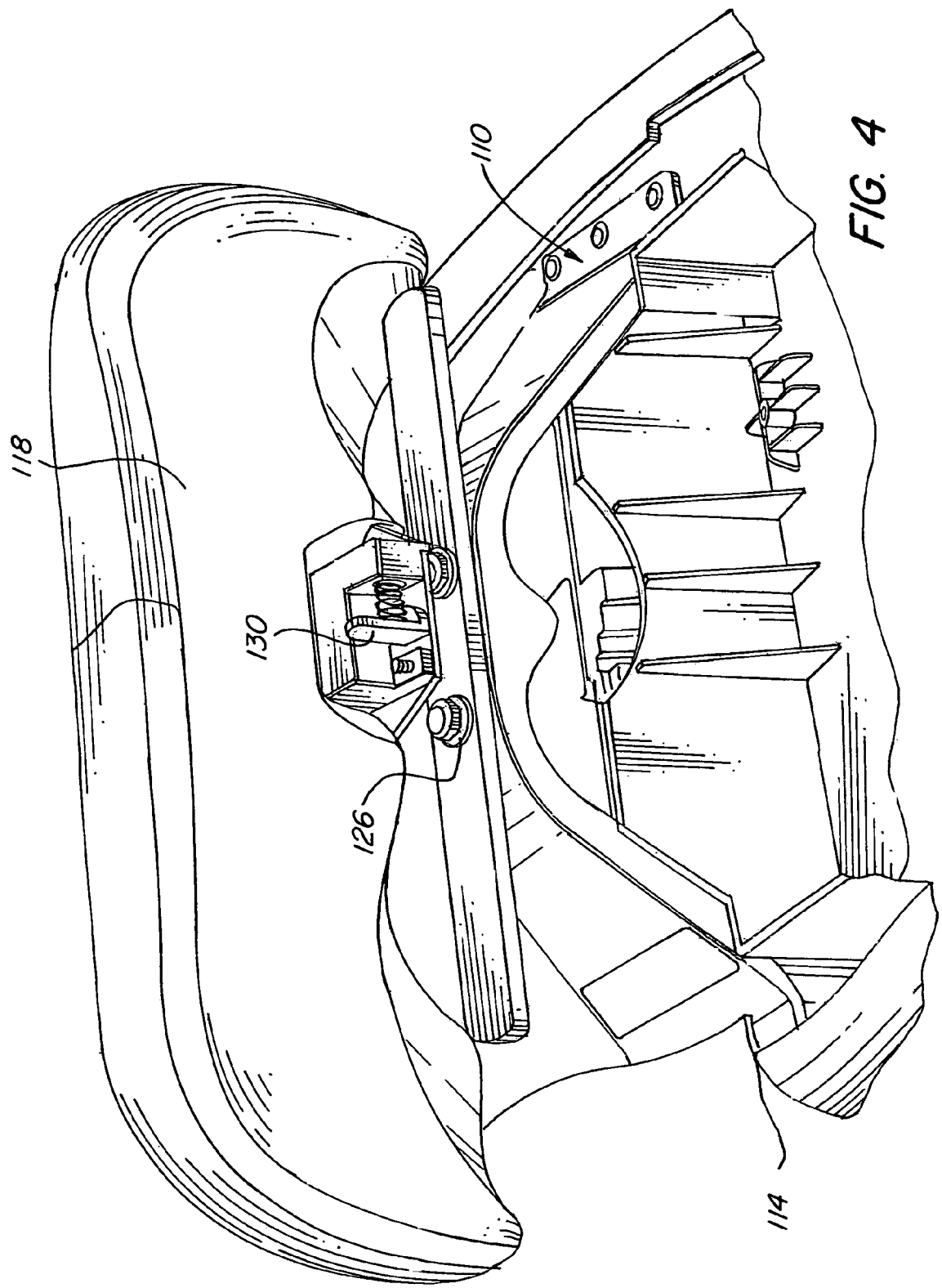
FIG. 4 is an enlarged fragmentary perspective view of the rear of the driver's seat with the latch housing mounted on the driver's seat.
Figure 5:
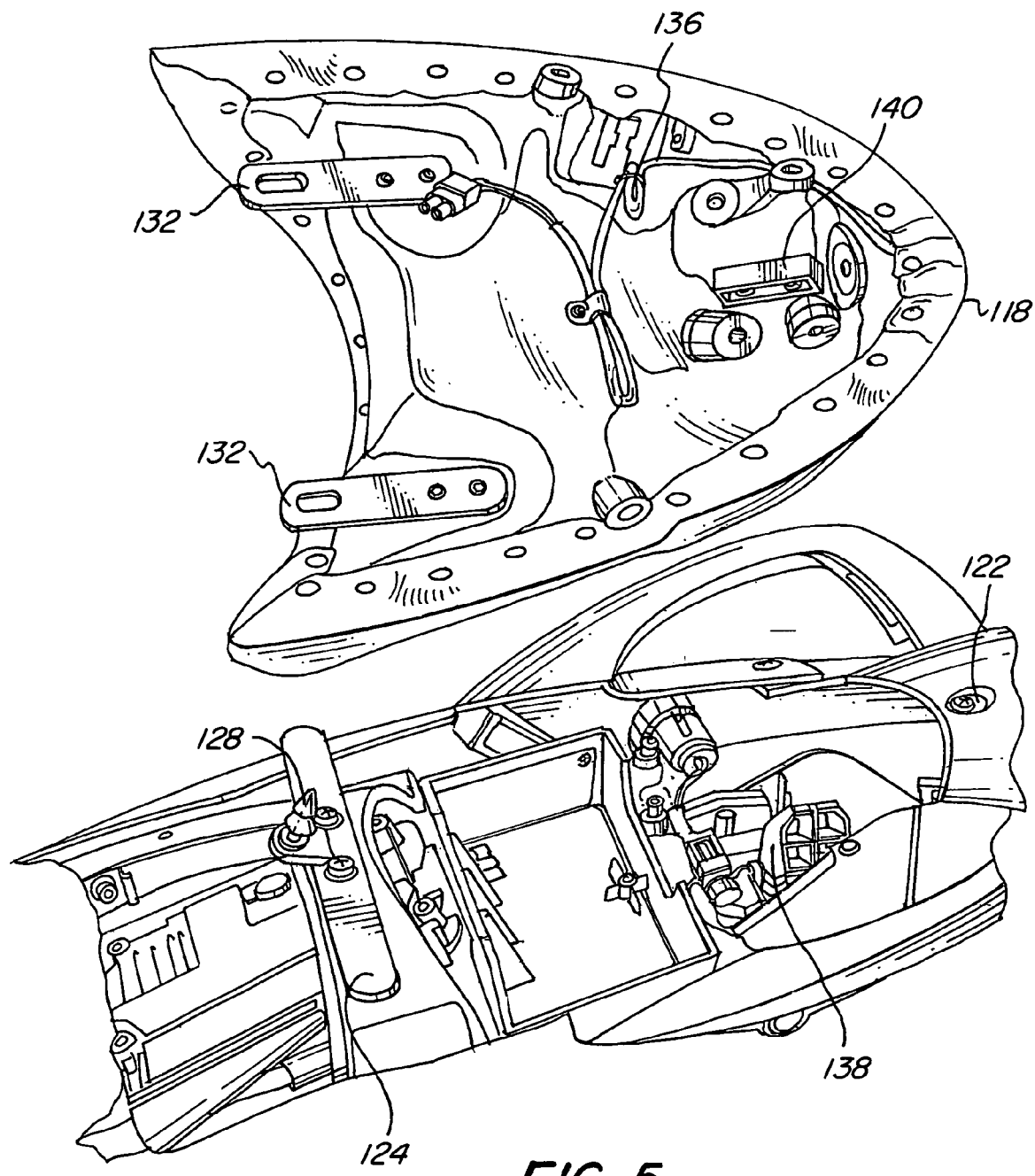
FIG. 5 is a fragmentary perspective view of the motorcycle body with the driver's seat removed and with the passenger seat enlarged and rotated 90° so as to display the bottom view thereof.
Figure 6:
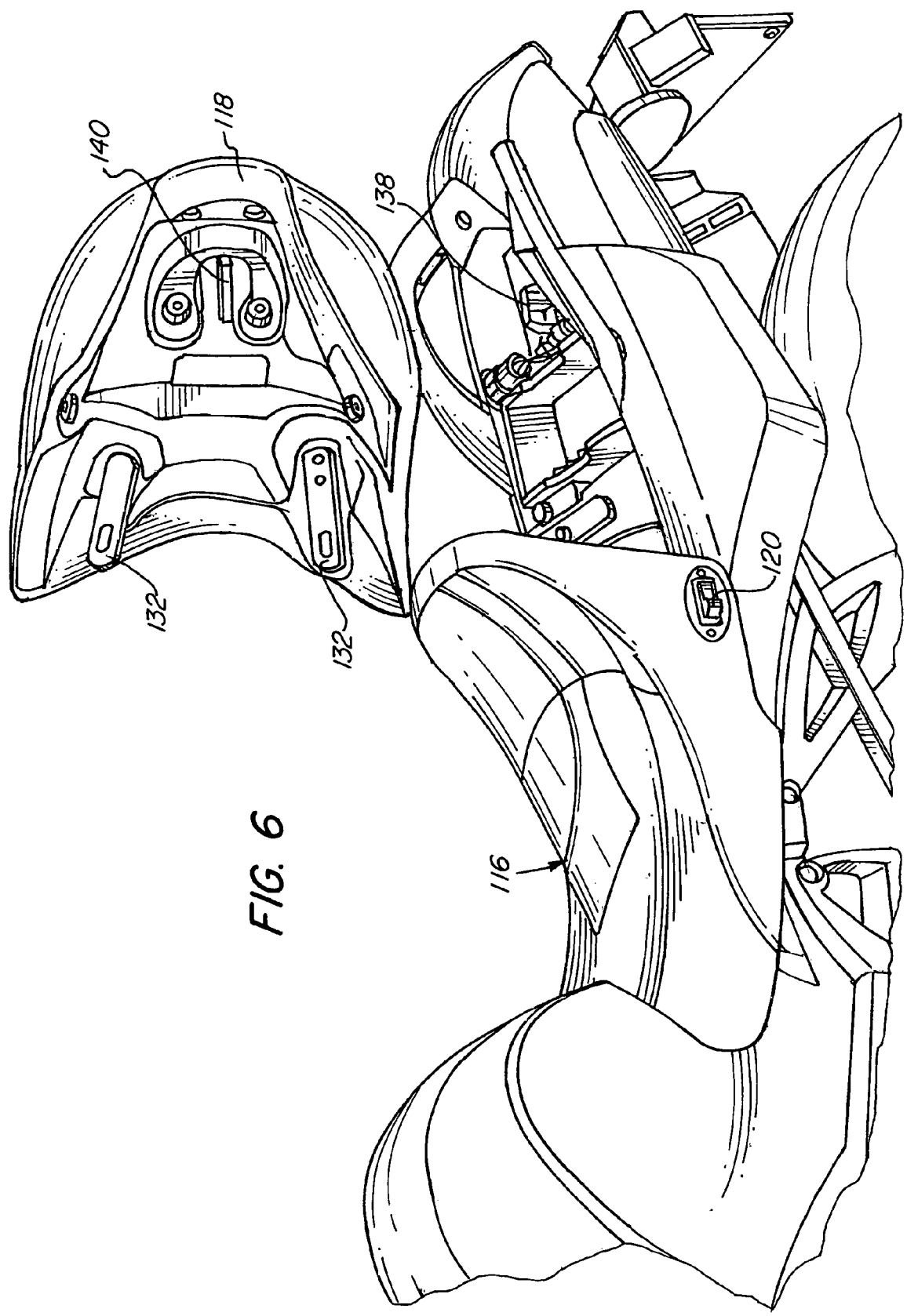
FIG. 6 is similar to FIG. 5 except that the driver's seat is shown installed upon the motorcycle chassis.
Figure 7:
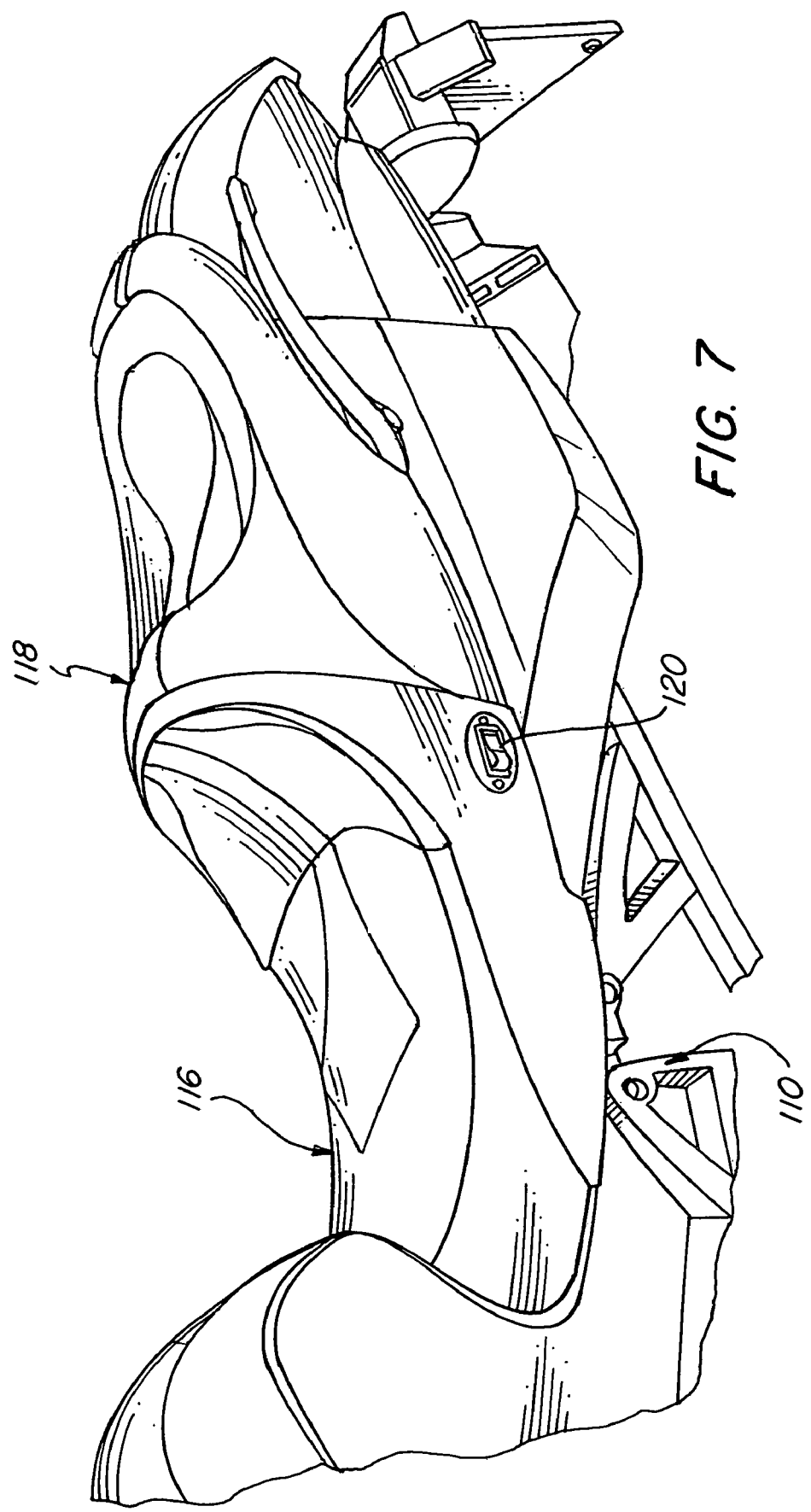
FIG. 7 is a fragmentary perspective view of the motorcycle assembly showing the driver and passenger seats both assembled upon the chassis.

In FIG. 4, the housing releasable latch 130 which will receive the latch pin 128 is mounted on the rear of the driver's seat 116. In FIG. 5, the passenger seat 118 has two forwardly extending tongues 132 which are mounted on the rigid platform 134 and will seat under the bracket 124. Not shown is the latch 130 which is also mounted on the platform 134.

Mounted on the rear end of the platform 136 of the passenger seat 118 is a latch element 138 which will engage in the latch element 140 which is mounted on the chassis 110. Also seen in FIG. 5 is the key lock 122 which will prevent, or permit, the unlatching of the elements 138, 140.

Figure 8:
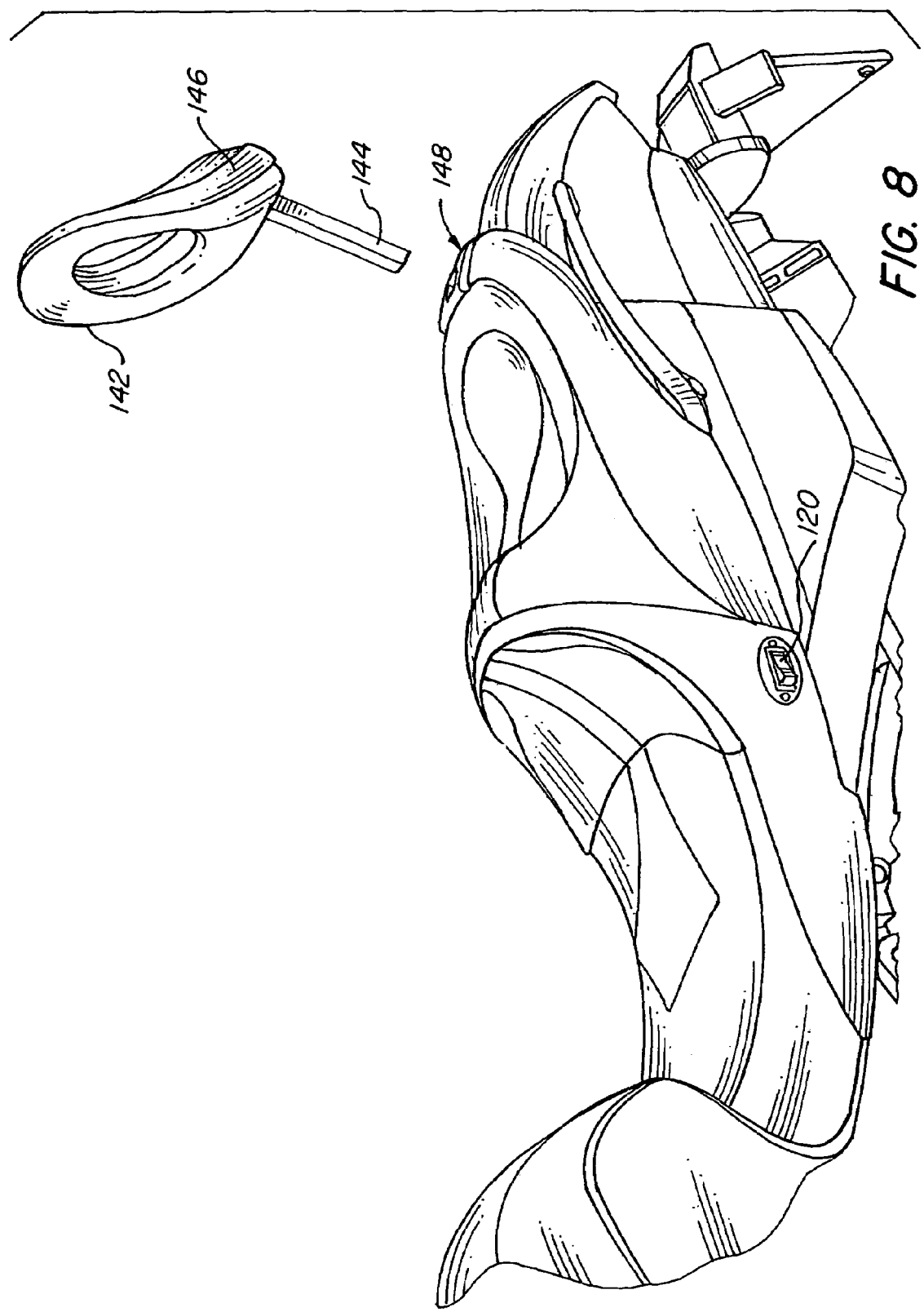
FIG. 8 is a view similar to FIG. 7 but showing a passenger backrest about to be inserted into the rear portion of the passenger seat.
Figure 9:
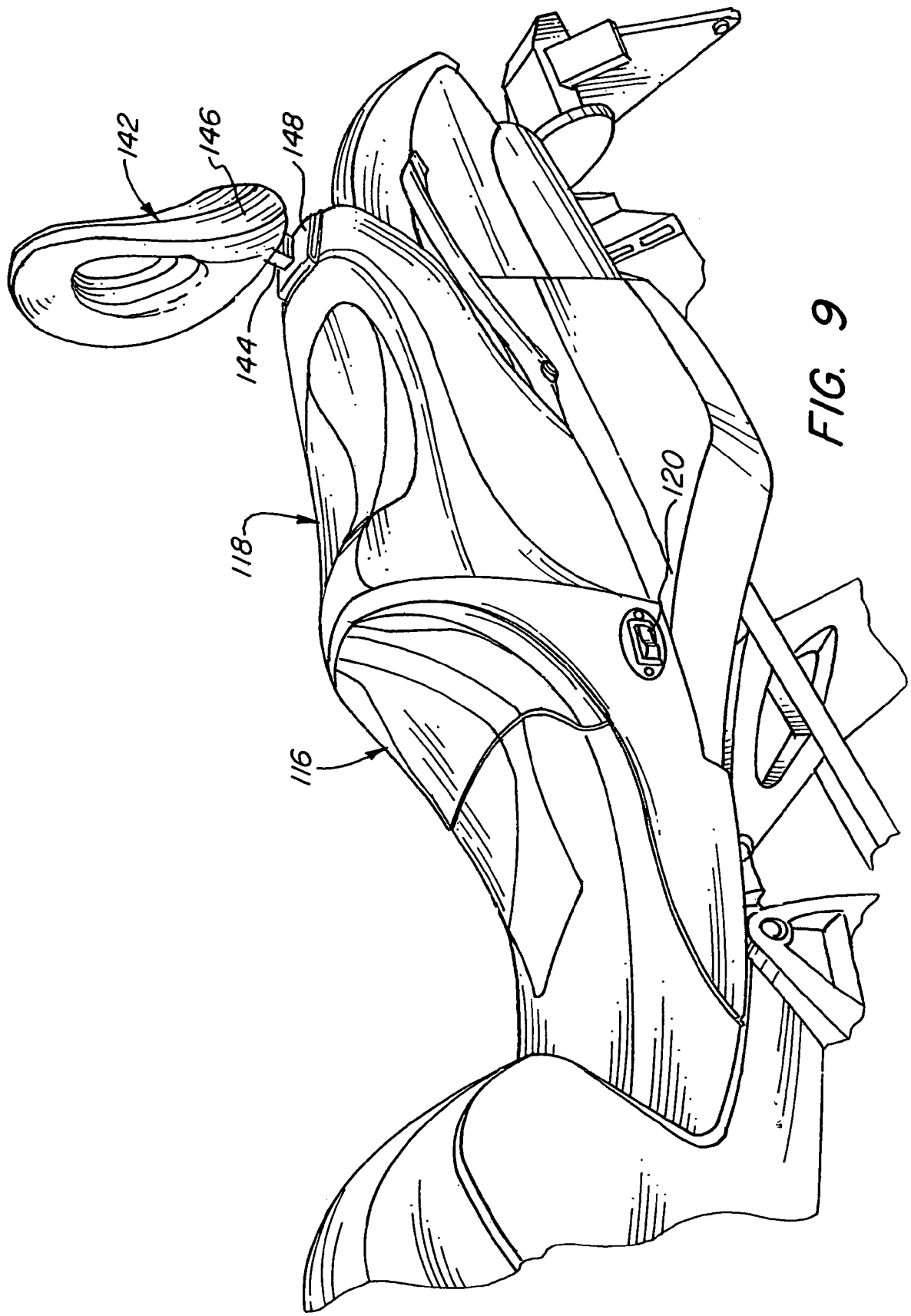
FIG. 9 is a similar view but with the backrest installed.

In FIG. 8, there is also shown a passenger backrest generally designated by the numeral 142 which includes an elongated arm 144 and a cushion 146 at the upper end thereof. At the rear end of the passenger seat 118 is a receptacle 148 secured to the platform 136 of the passenger seat 118. In FIG. 9, the arm 144 has been seated in the receptacle 148.

Figure 10:
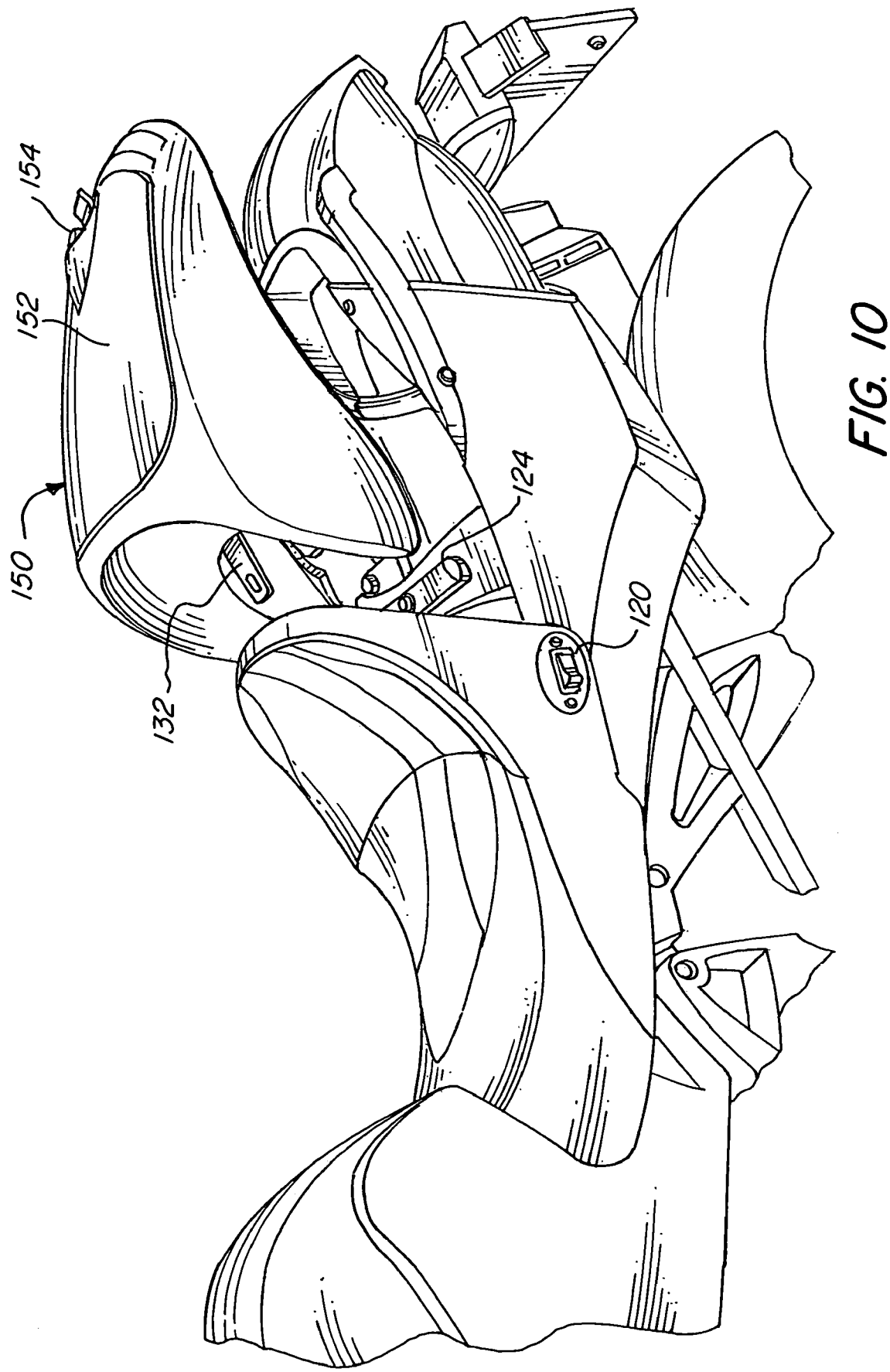
FIG. 10 is a view similar to FIG. 2 except that the rear module is a storage compartment.
Figure 11:
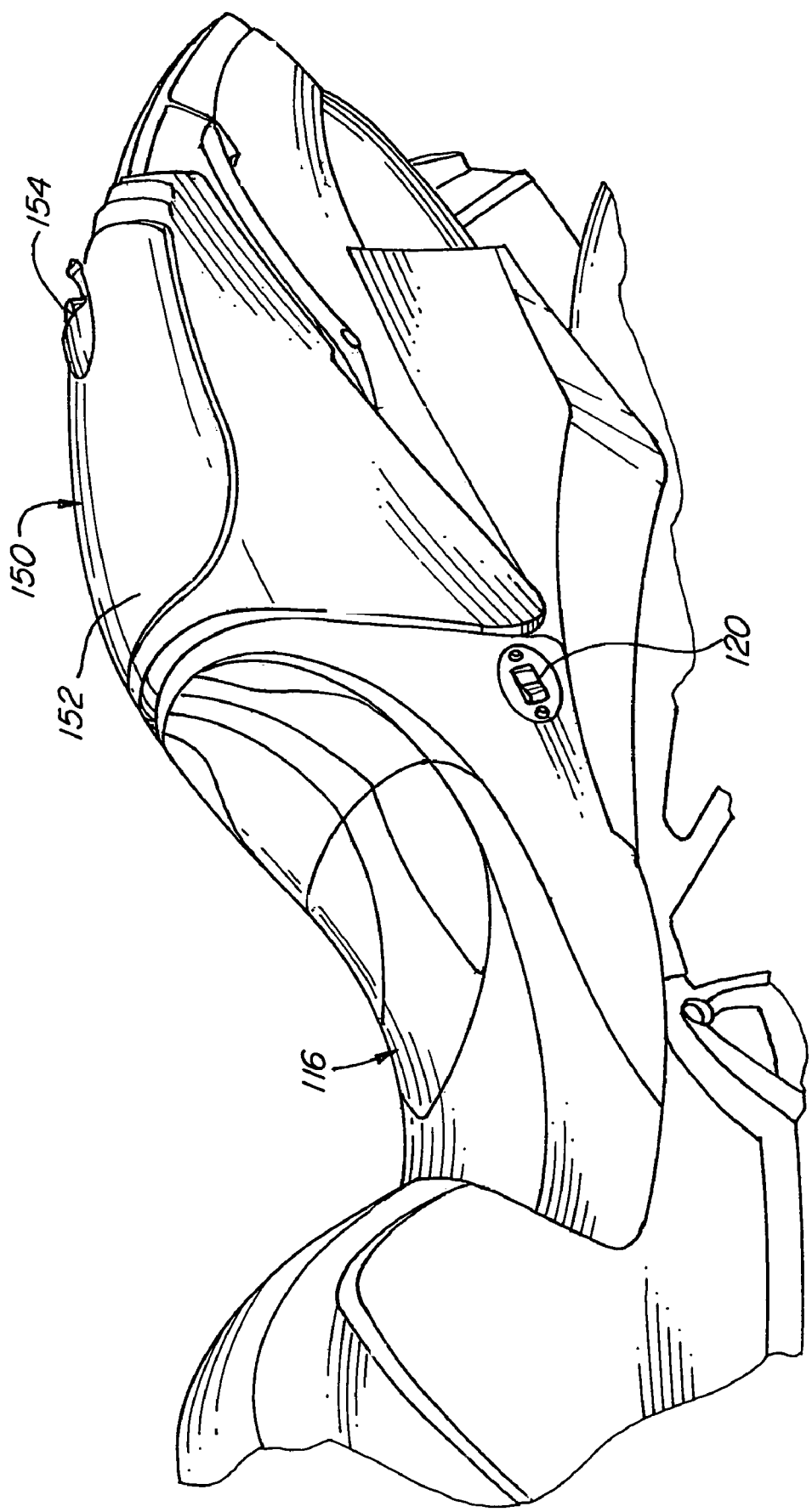
FIG. 11 is a similar view with the storage compartment mounted on the chassis.
Figure 12:
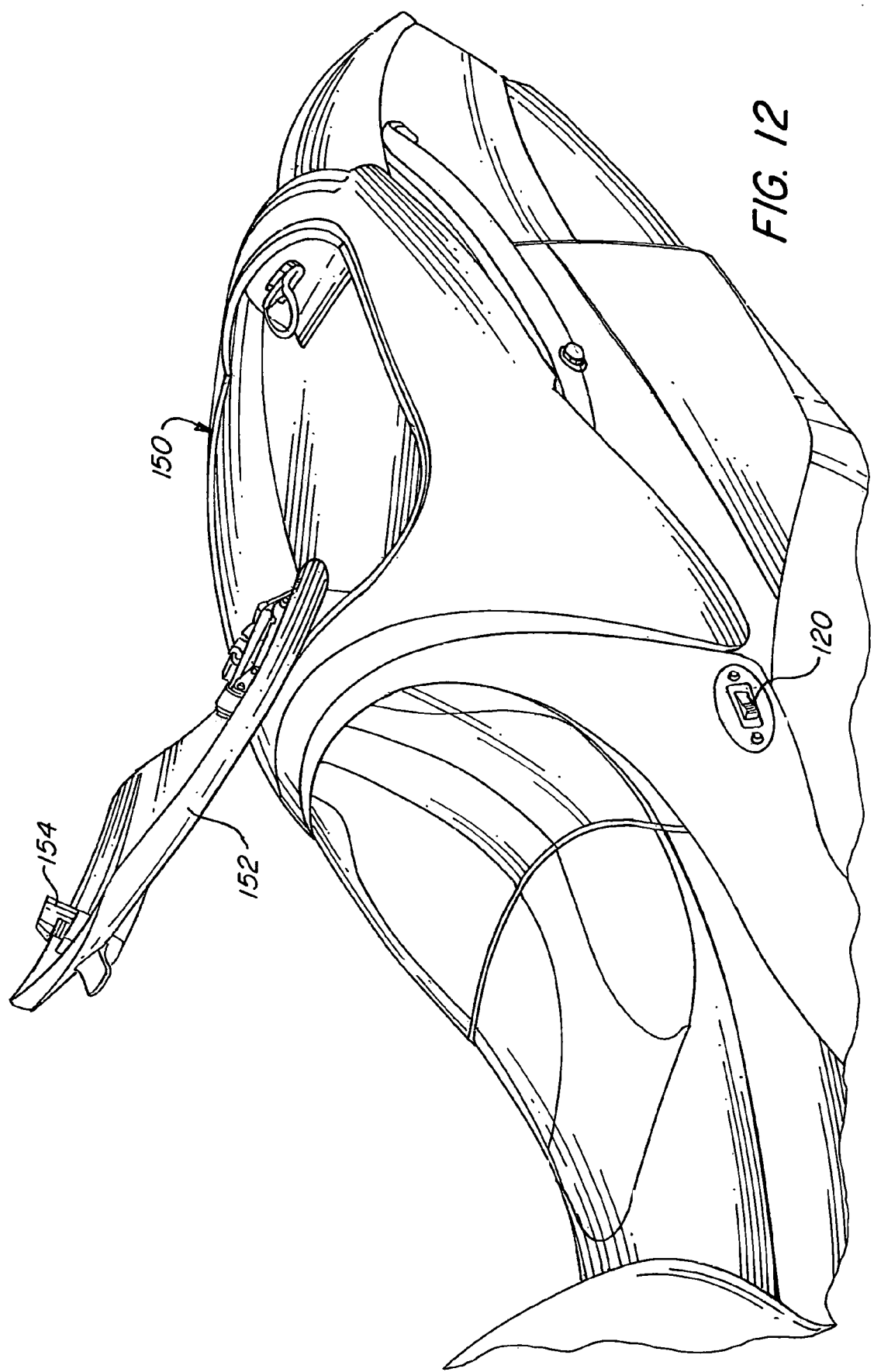
FIG. 12 is a similar view with the door to the storage compartment shown in an open position.

Turning next to FIGS. 10-12, therein illustrated is a storage compartment generally designated by the numeral 150 for mounting on the chassis 110. The storage compartment 150 is molded with the front portion configured to seat snugly against the rear surface of the driver's seat 116. The compartment has a door 152 which is locked by the key lock 154.

Secured to the bottom surface of the compartment 150 are a pair of forwardly projecting tangs 160 (only one of which is shown) which are slid under the bracket 124. In FIG. 11, the storage compartment 150 is latched and locked in place by the key lock 154. In FIG. 12, the compartment door 152 has been opened.

Figure 13:
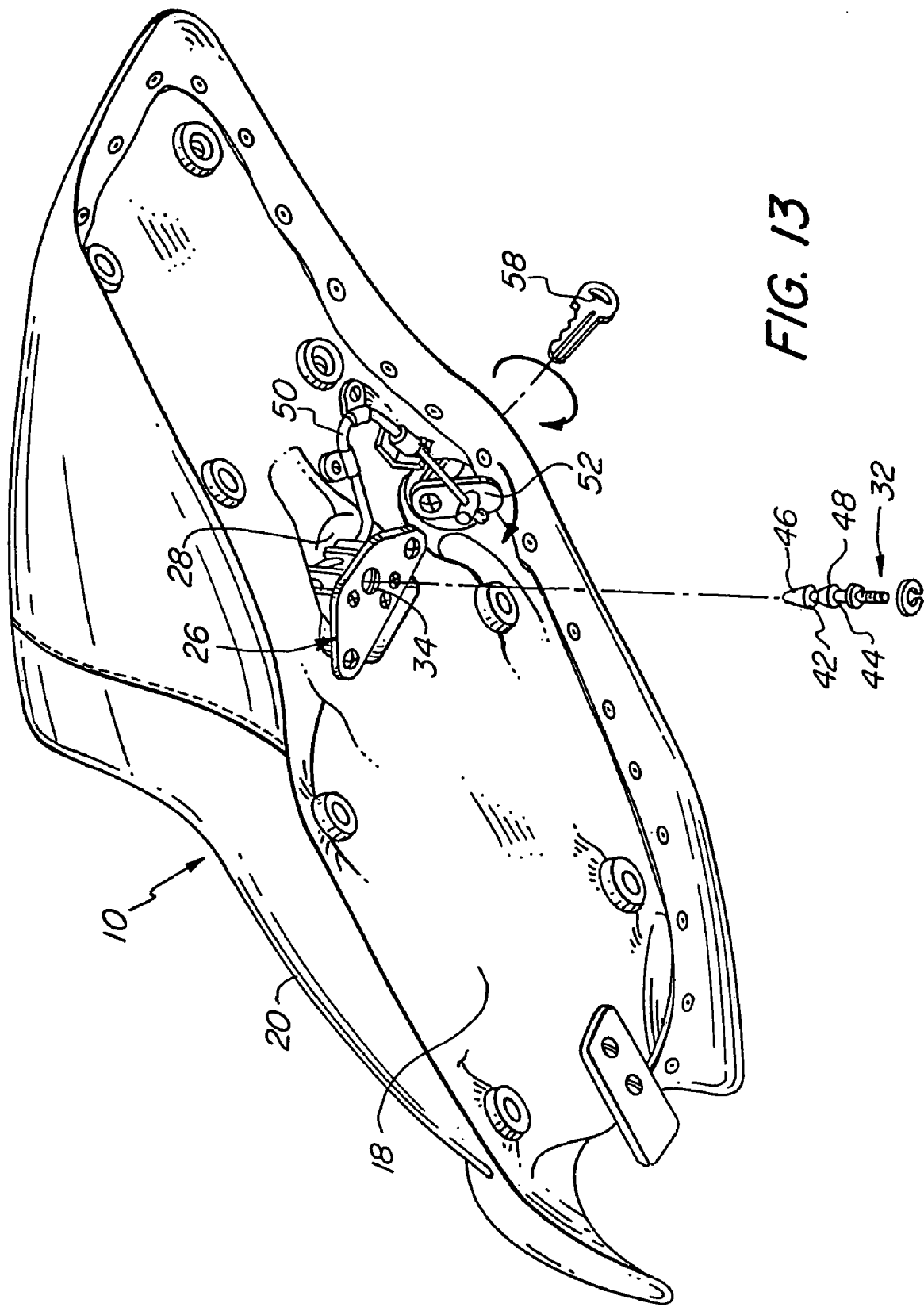
FIG. 13 is a bottom view of a driver's seat showing a first embodiment of a preferred latch and key lock locking assembly.
Figure 14:
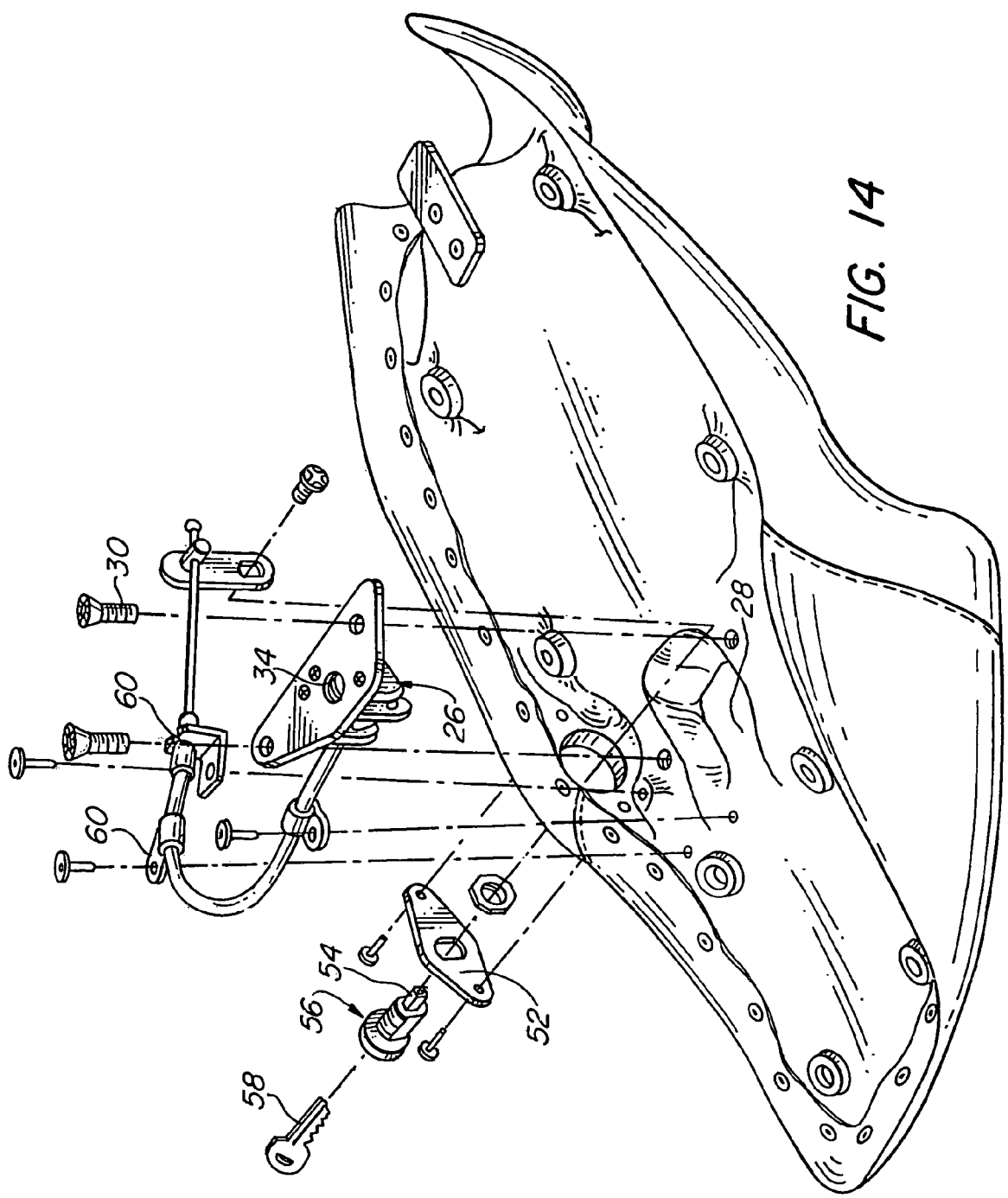
FIG. 14 is a partially exploded view of the components of FIG. 13.
Figure 15:
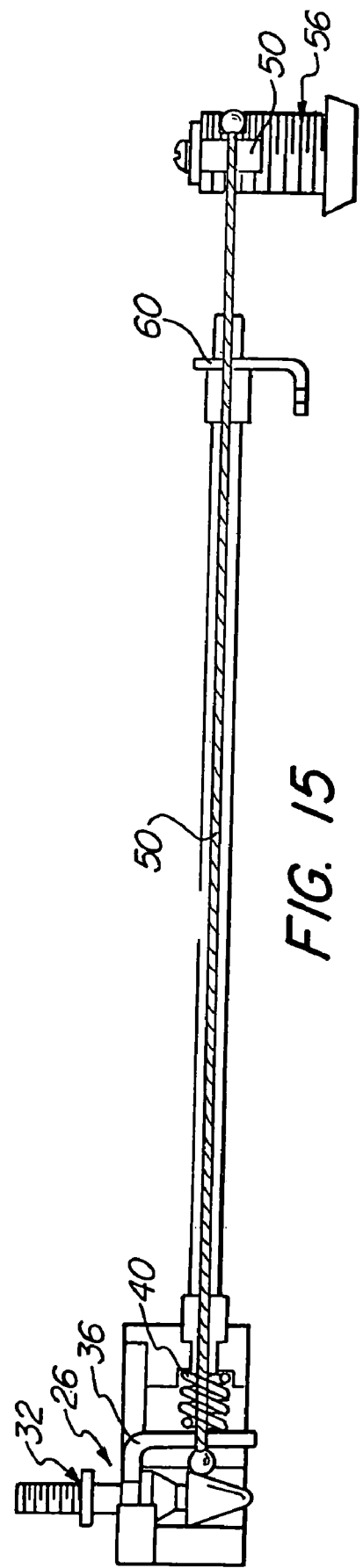
FIG. 15 is a schematic view of the locking components in the locked position.

Turning next to FIGS. 13-15, therein illustrated is a driver's seat generally designated by the numeral 10 which utilizes a preferred front latch. The seat 10 includes an underlying platform or base 18 secured to the chassis (not shown) of the motorcycle. On the platform 18 is cushioning material (not shown), and a cover 20 of leather and/or other suitable material extends over the entire exposed top and side surfaces of the motorcycle seat 10 and is secured to the lower surface of the platform 18. A latch housing generally designated by the numeral 26 is secured in a recess 28 of the platform 18 by fasteners 30. Mounted on the motorcycle chassis (not shown) is the latch pin generally designated by the numeral 32 which extends into the passage 34 in the housing 26. A latch lever 36 is pivotably mounted on the pivot pin 38 in the housing 26 of the latch, and the spring 40 biases the latch lever 36 to engage the collars or shoulders 42, 44 provided by the frustoconical portions 46, 48 on the latch pin 32.

A key lock 56 is shown as mounted on the side of the seat 10. The pivoting of the latch lever 36 is effected by a flexible cable 50 which is attached at one end to the latch lever 36 and at its other end to the arm 52 on the rotatable shaft 54 in the key lock generally designated by the numeral 56. When the key 58 is rotated, the shaft 54 rotates and with it the arm 52. Rotation of the arm 52 is translated into motion of the cable 50 which pivots the end of the latch lever 36 against the biasing pressure of the spring 40 to disengage from a shoulder or collar 44 on the latch pin 32. The cable 50 is supported in guides 60 and the housing of the lock 56 has a portion projecting through the cover plate 22 for insertion of the key 58 to effect its operation.

Figure 16:
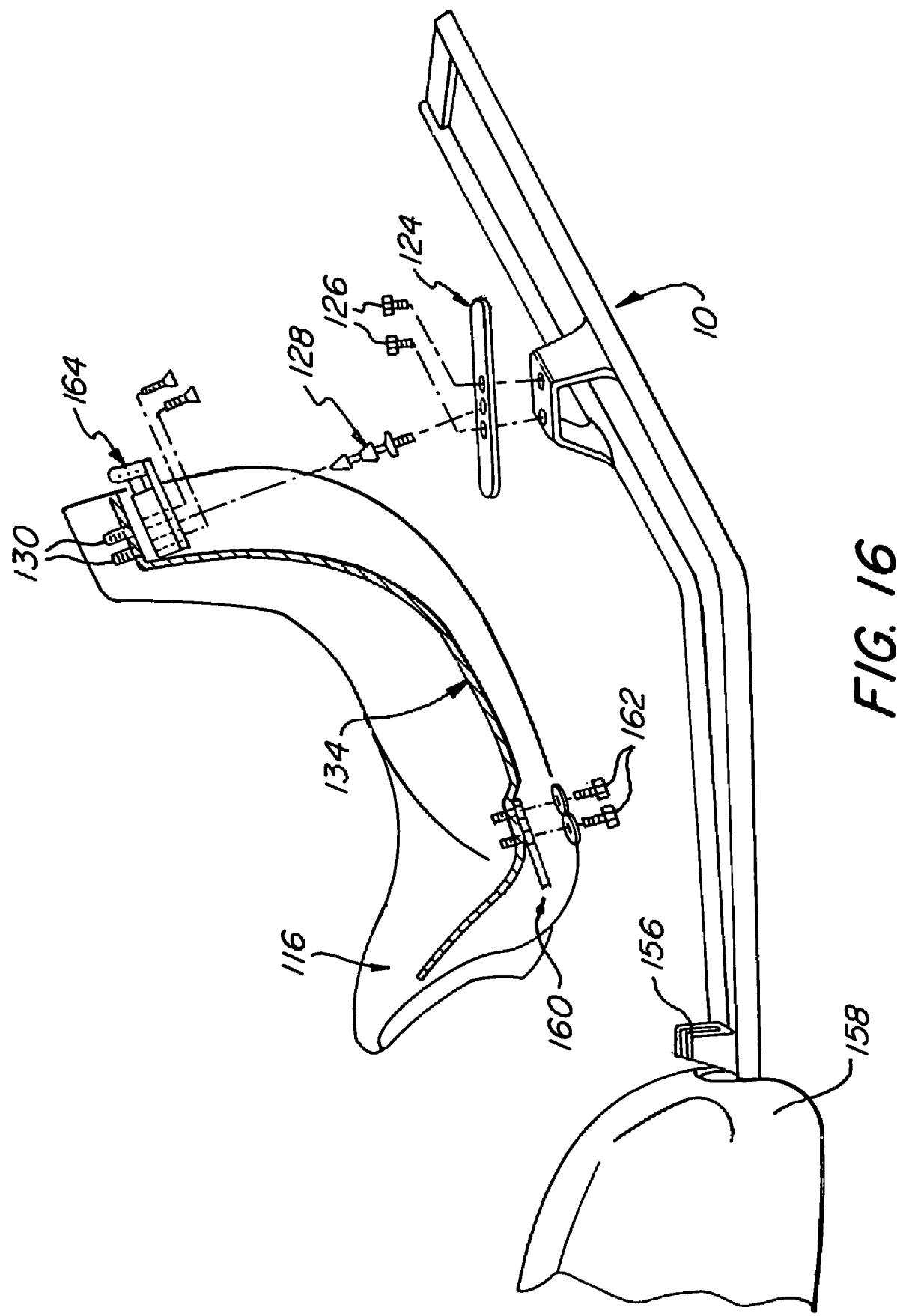
FIG. 16 is a partially exploded schematic view of a driver's seat and mounting components.
Figure 17:
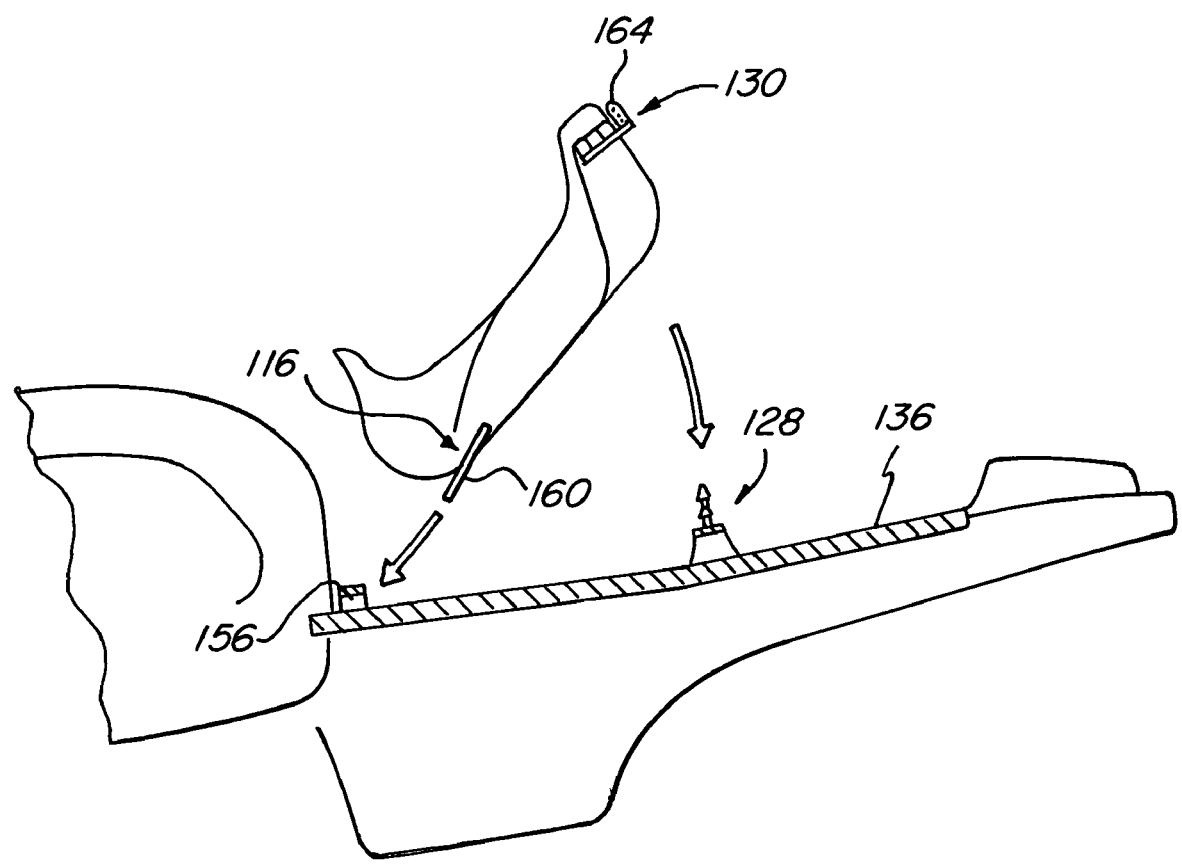
FIG. 17 is a schematic view of a driver's seat installation.
Figure 18:
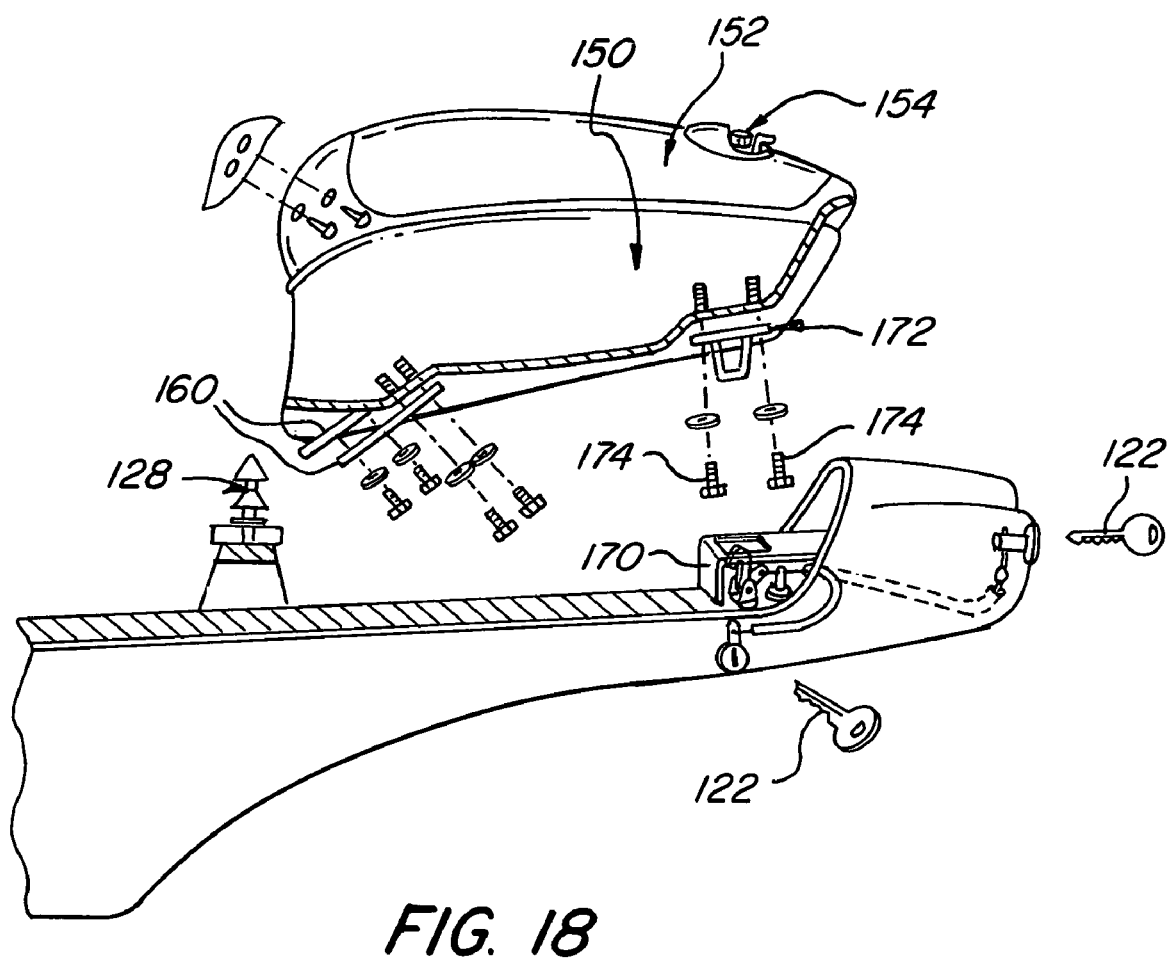
FIG. 18 is a schematic view of a storage container and mounting components.
Figure 19:
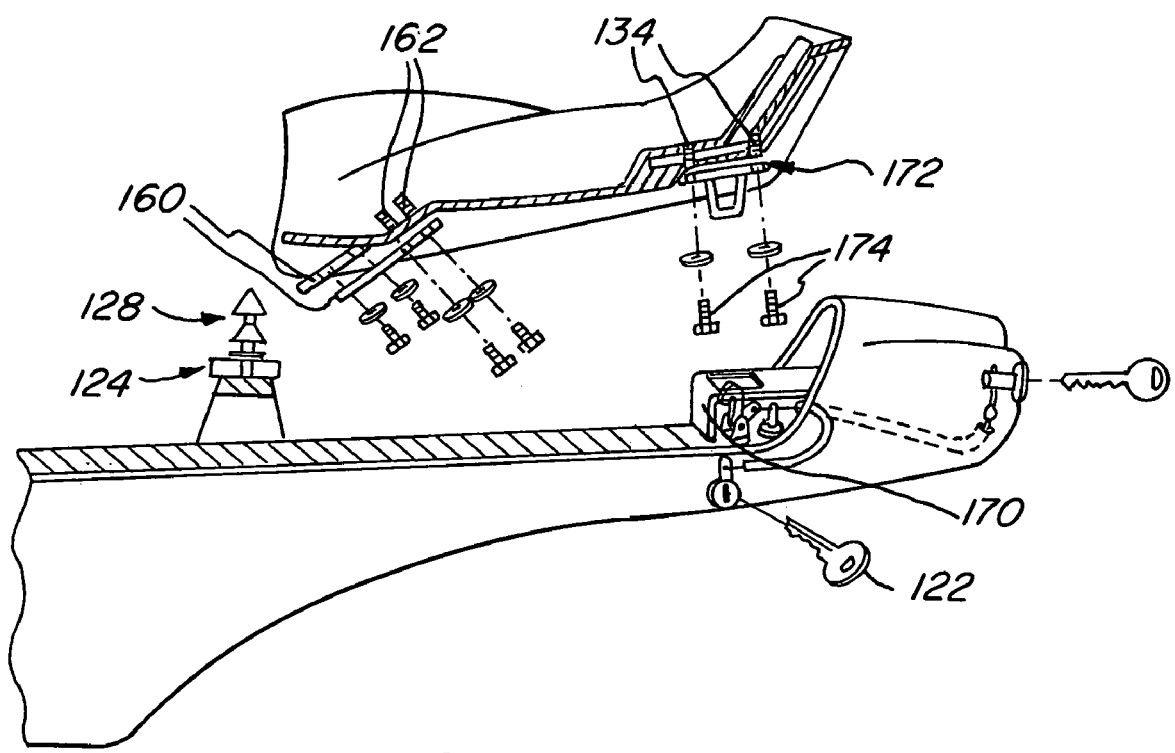
FIG. 19 is a schematic view of a passenger seat and mounting components.
Figure 20:
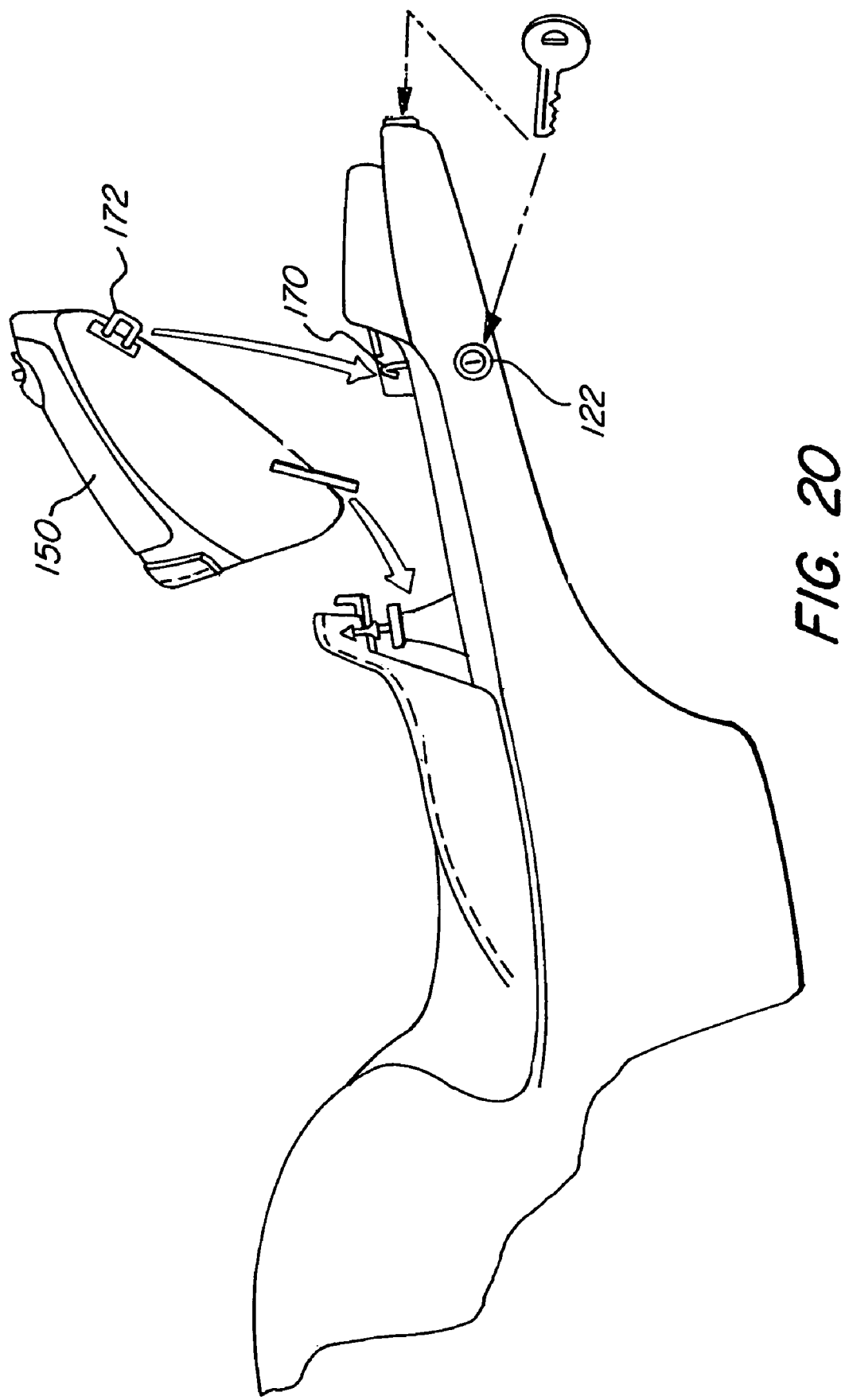
FIG. 20 is a schematic view of the passenger seat being installed.
Figure 21:
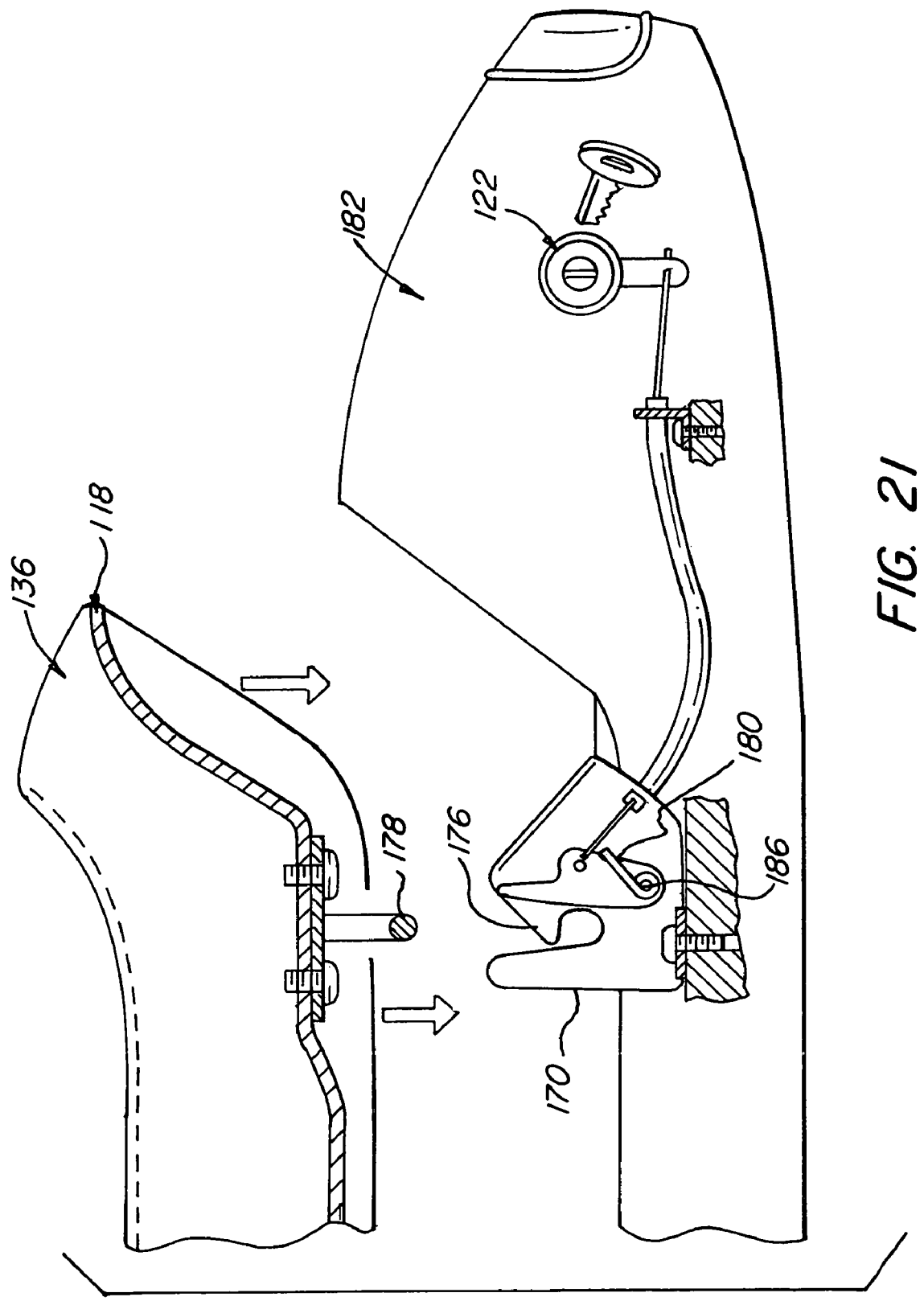
FIG. 21 is a schematic view of the passenger seat and the latching and locking components.

The components for latching the driver's seat 116 are diagrammatically shown in FIGS. 16 and 17. As is common for both solo and tandem seats, a front loop 156 mounted on the chassis 110 rearwardly of the gas tank 158 and the driver's seat 116 has a front tang 160 secured by the fasteners 162 to the platform 134. The bracket 124 is mounted on the chassis 110 by the fasteners 126 and the latch pin 128 is mounted therein. The latch 130 is secured to the platform 134 by the fasteners 162.

In mounting the driver's seat 116, the front tang 160 is inserted into the front loop 156 and the driver's seat 116 is then pivoted downwardly so that the latch pin 128 seats in the latch housing 130. Thereafter, the rear components 116,150 may be mounted as will be described hereinafter. To remove the driver's seat 116, the latch lever 164 is pivoted to disengage it from the latch pin 128 so that the seat 116 can be pivoted upwardly to allow it to be moved rearwardly to withdraw the tang 160 from the front loop 156.

The latching and locking elements for the rear component 118,150 are schematically illustrated in FIGS. 10 and 21-23. Adjacent the rear of the chassis 110 is mounted a latch housing 170, and on the bottom surface of the storage compartment 150 is a latch hook 172 which is mounted thereon by the fasteners 174. The latch hook 172 which is an inverted U-shaped element cooperates with the latch arm 176 which pivots in the housing 170 and abuts the pin 186.

Figure 22:
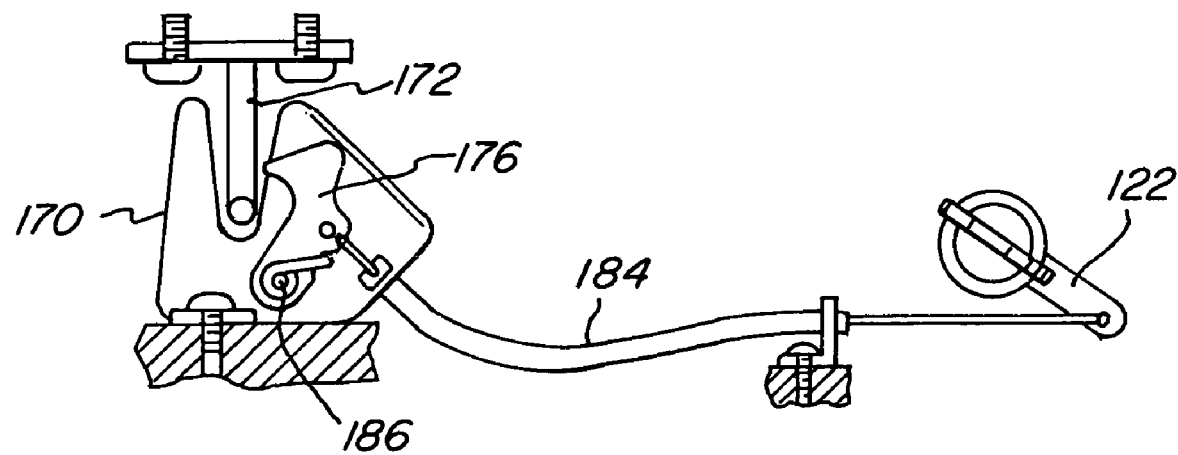
FIG. 22 is a schematic view of the latch and key lock in the released position.
Figure 23:
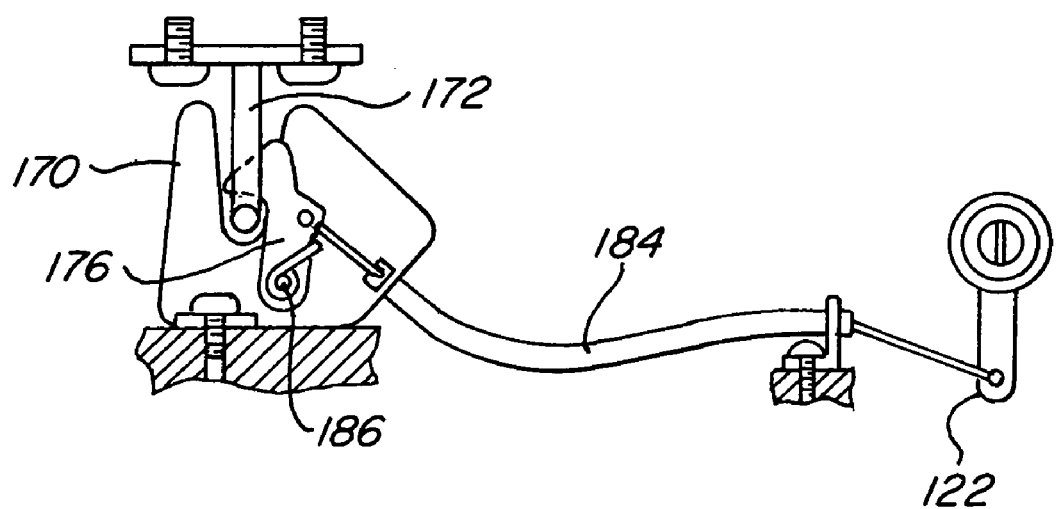
FIG. 23 is a schematic view of the components in the latched and locked position.

As the rear of the compartment 150 is pivoted downwardly, the latch hook 172 moves into the latch housing 170 and cams the latch arm 176 to the right as seen in FIG. 22 to allow the hook 172 to bottom in the housing. The spring 180 then biases the latch arm 176 to the left as seen in FIG. 23 to capture the hook 172 and thereby to latch the compartment 150 firmly on the chassis 110.

The key lock 122 is mounted on the side of the tail section 182 of the body and has one end of the cable 184 connected thereto. The other end of the cable 184 is connected to the latch arm 176, and rotation of the key will rotate the lock arm 190 to pull on the cable and rotate the latch arm 176 against the biasing pressure of the spring 180.

As will be readily appreciated the convertible motorcycle assembly of the present invention may utilize latch and key lock mechanisms on the motorcycle prior to the adaptation. For example, the key lock for many of tandem saddles can be utilized as a key lock functioning with respect to the front seat. Similarly, the key lock mounted on the rear of some seats can be modified to provide the lock action for the rear component.

The latches which are shown in the attached drawings have been found particularly advantageous. However, other latch structures may be employed so long as they are capable of being coupled to a latch system at least insofar as the rear component is concerned.

Moreover, it is really not necessary to have a key lock for the driver's seat since the latch mechanism for that seat cannot be accessed unless the rear component is removed. Thus, the single key lock functioning with respect to the rear latch essentially provides the lock function for both the driver's seat and the rear component.

The placement of the key locks is largely a matter of aesthetic since cable structures can be readily utilized to connect the key lock to a remote latch.

Thus, it can be seen from the foregoing detailed specification and the attached drawings that the motorcycle assembly of the present invention provides the versatility of allowing the owner to rapidly exchange a storage compartment for a passenger seat and vice versa. The mounting elements on the chassis function for both types of rear components. The added components can be readily fabricated. The rear components can be modified as necessary to blend into the design of the body thereabout.

Having thus described the invention, what is claimed is:

1. A convertible motorcycle assembly comprising:
   (a) a chassis;
   (b) a driver's seat;
   (c) first latch means securing said driver's seat to the forward portion of said chassis, said latch means including a releasable first latch element on said chassis and a cooperating latch element on said driver's seat engaged with said first latch element;
   (d) a bracket mounted on said chassis adjacent the rearward end of said driver's seat;
   (e) a passenger seat mounted on said chassis rearwardly of said driver's seat, the forward end of said passenger seat having at least one forwardly extending tongue engaged with said bracket;
   (f) second latch means on said passenger seat securing the seat to said chassis and comprising a releasable second latch element on said chassis adjacent the rear end of said passenger seat and a cooperating latch element on said passenger seat engaged with said second latch element;
   (g) a first key lock engaged with said second latch means on said passenger seat which is engaged with said second latch for effecting and preventing release of said second latch means, whereby the passenger seat can be readily released and removed from the chassis and replaced by a storage container with the sane mounting means; and
   (h) said latch means for securing said driver's seat on said chassis including (i) a latch pin mounted on the motorcycle chassis, (ii) a latch housing mounted on said seat and having a passage into which said latch pin extends, (iii) a latch lever pivotably mounted in said housing and pivotable into a latching position in which it engages said latch pin to prevent its retraction from the latch housing, biasing means biasing said latch lever into said latching position, said latch lever being pivotable against the biasing action of said biasing means to disengage said latch lever from said latch pin and permit the driver's seat to be disengaged from said latch pin.

2. The convertible motorcycle assembly in accordance with claim 1 wherein there is included a key lock mounted on the exterior of said passenger seat and including a rotatable shaft and a latch lever engaging means on said shaft engageable with said latch lever to effect pivoting thereof.

3. The convertible motorcycle assembly in accordance with claim 1 wherein said passenger seat has a platform with a lower suffice upon which said latch housing is mounted.

4. The convertible motorcycle assembly in accordance with claim 1 wherein said latch pin has a shoulder in its circumference and said latch lever engages below said shoulder in said latching position.

5. The convertible motorcycle assembly in accordance with claim 1 wherein said latch pin has two frustoconical portions along its axial length which provide a pair of shoulders beneath which said latching lever is engageable.

6. The convertible motorcycle assembly in accordance with claim 2 wherein said key lock has a housing in which said shaft is rotatable and a portion on an exterior surface of said driver's seat containing a key receiving recess for rotation of said shaft between locked and unlatching positions.

7. A convertible motorcycle assembly comprising:
   (a) a chassis;
   (b) a driver's seat;
   (c) first latch means securing said driver's seat to the forward portion of said chassis, said latch means including a releasable first latch element on said chassis and a cooperating latch element on said driver's seat engaged with said first latch element;
   (d) a bracket mounted on said chassis adjacent the rearward end of said driver's seat;
   (e) a storage compartment for mounting on said chassis rearwardly of said driver's seat, the forward end of said passenger seat having at least one forwardly extending tongue engaged with said bracket;
   (f) second latch means on said storage compartment securing the storage compartment to said chassis and comprising a releasable second latch element on said chassis adjacent the rear end of said storage compartment and a cooperating latch element on said compartment engaged with said second latch element;
   (g) a first key lock engaged wit said second latch means on said compartment which is engaged with said second latch for effecting and preventing release of said second latch means, whereby the compartment can be readily released and removed from the chassis and replaced by the passenger seat having the same mounting means; and
   (h) said latch means for securing said driver's seat on said chassis including (i) a latch pin mounted on the motorcycle chassis, (ii) a latch housing mounted on said seat and having a passage into which said latch pin extends, (iii) a latch lever pivotably mounted in said housing and pivotable into a latching position in which it engages said latch pin to prevent its retraction from the latch housing, biasing means biasing said latch lever into said latching position, said latch lever being pivotable against the biasing action of said biasing means to disengage said latch lever from said latch pin and permit the driver's seat to be disengaged from said latch pin.

8. The convertible motorcycle assembly in accordance with claim 5 wherein said latch pin has two frustoconical portions along its axial length which provide a pair of shoulders beneath which said latching lever is engageable.

9. The convertible motorcycle assembly in accordance with claim 6 wherein said key lock has a housing in which said shaft is rotatable and a portion on an exterior surface of said driver's seat containing a key receiving recess for rotation of said shaft between locked and unlatching positions.

* * * * *